INVENTORS
Toshihiko Takagi
Shusaku Nagahara
BY
Hill, Sherman, Meroni, Gross & Simpson
ATTORNEY

COLOR VIDEO SIGNAL GENERATING APPARATUS

Filed Dec. 26, 1963 6 Sheets-Sheet 2

INVENTORS
Toshihiko Takagi
Shusaku Nagahara

BY

Hill, Sherman, Meroni, Gross & Simpson
ATTORNEY

COLOR VIDEO SIGNAL GENERATING APPARATUS

Filed Dec. 26, 1963 6 Sheets-Sheet 3

INVENTORS
Toshihiko Takagi
Shusaku Nagahara
BY
Hill, Sherman, Meroni, Gross & Simpson
ATTORNEY INVENTORS
Toshihiko Takagi
Shusaku Nagahara
BY
Hill, Sherman, Meroni, Gross & Simpson
ATTORNEY

COLOR VIDEO SIGNAL GENERATING APPARATUS

Filed Dec. 26, 1963

INVENTORS
Toshihiko Takagi
Shusaku Nagahara

BY
Hill, Sherman, Meroni, Gross & Simpson
ATTORNEY

INVENTORS
Toshihiko Takagi
Shusaku Nagahara
BY
Hill, Sherman, Meroni, Gross & Simpson
ATTORNEY

3,300,580
COLOR VIDEO SIGNAL GENERATING APPARATUS

Toshihiko Takagi and Shusaku Nagahara, Kawasaki, Japan, assignors to Nippon Columbia Kabushikikaisha (Nippon Columbia Co., Ltd.), Kawasaki, Japan, a corporation of Japan Filed Dec. 26, 1963, Ser. No. 333,397
Claims priority, application Japan, Dec. 27, 1962, 37/59,021
24 Claims. (Cl. 178—5.4)

This invention relates to a color video signal generating apparatus and more particularly to a novel apparatus for producing a plurality of continuous video signals of different colors through the use of a single image pickup tube.

A conventional system of obtaining a plurality of continuous video signals of different colors requires a plurality of image pickup tubes in response to the number of colors to be separated, so that an apparatus thereof becomes inevitably large in size and complicated in structure. There has been proposed a method of obtaining a plurality of color video signals by the use of a single image pickup tube, and this is a sequential method in which colors from an object to be televised are projected to the photoelectro conversion layer of an image pickup tube through a color analyzing filter that color characteristics are changed alternately, but this method is disadvantageous in that since the resultant video signals do not coincide in time with the respective color signals, flickers are liable to occur.

The present invention resides in a highly improved color video signal generating apparatus comprising an image pickup tube provided with essentially a single video output terminal and a filter composed of strip filter elements which substantially pass all the colors from an object to be televised or intercept at least one of them and strip filter elements which essentially intercept one of the colors or a color different from that intercepted by the first mentioned strip filter elements, these two kinds of strip filter elements each being arranged alternately and periodically in a sequential order to form the filter. The filter is positioned in an optical path at a place optically or equivalently adherent to the photoelectro conversion layer in a manner so that the extending direction of the strip filter elements may intersect with the scanning direction of the image pickup tube. At the video output terminal of the image pickup tube, a camera output video signal is obtained, from which is separated through a band-pass filter a modulated signal composed of a carrier and a side band produced due to the periodic intersection of the color essentially intercepted by the strip filter elements with the scanning pattern of the image pickup tube. Then, the output of the band-pass filter and the camera output video signal of the image pickup tube are coupled to thereby produce a non-modulated signal for a color component different from the aforementioned modulated signal. By coupling the modulated signal and the non-modulated signal, there are produced video signals separated in different colors.

Other objects, features and advantages of this invention will become apparent from the following description taken in conjunction with the accompanying drawings, in which:

FIGURE 1 fundamentally shows an example of the system of the present invention;

Figure 1:
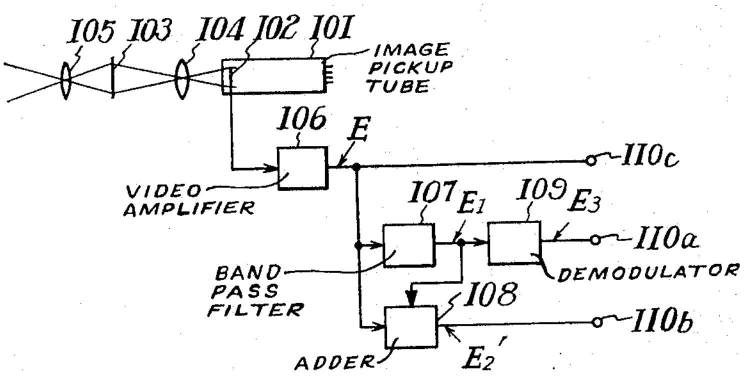
Figure 3:
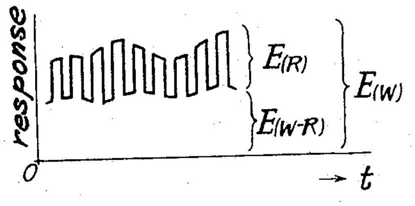
FIGURE 3 shows an example of the waveform of video output signals to be produced in the structure exemplified in FIGURES 1 and 2.
Figure 4:
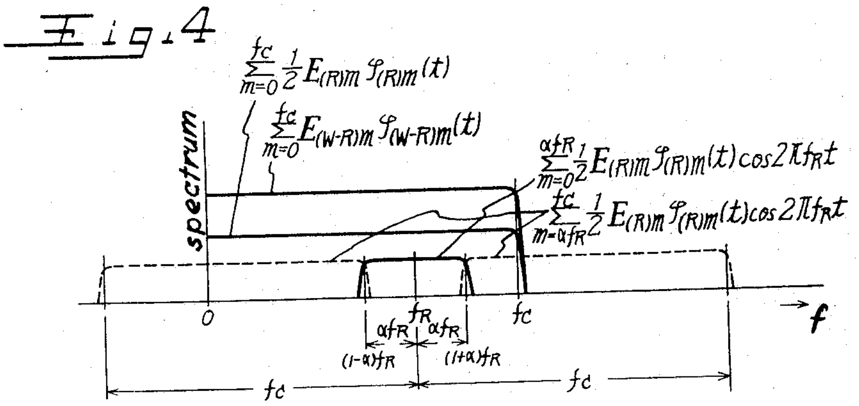
Figure 5:
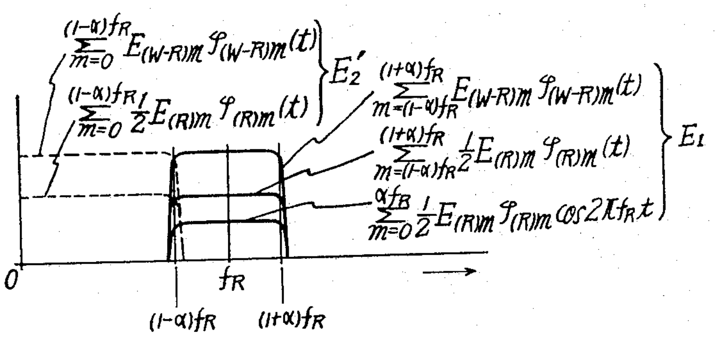
Figure 6:
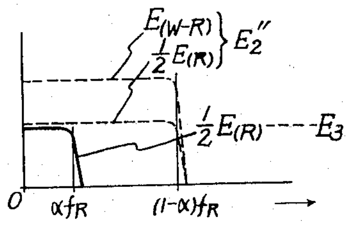
Figure 7:
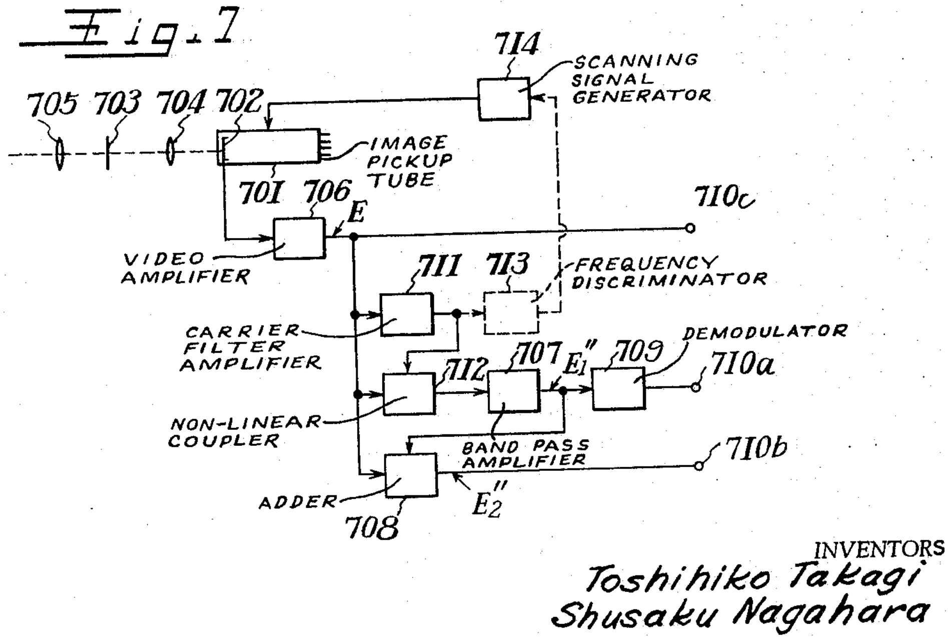
Figure 8:
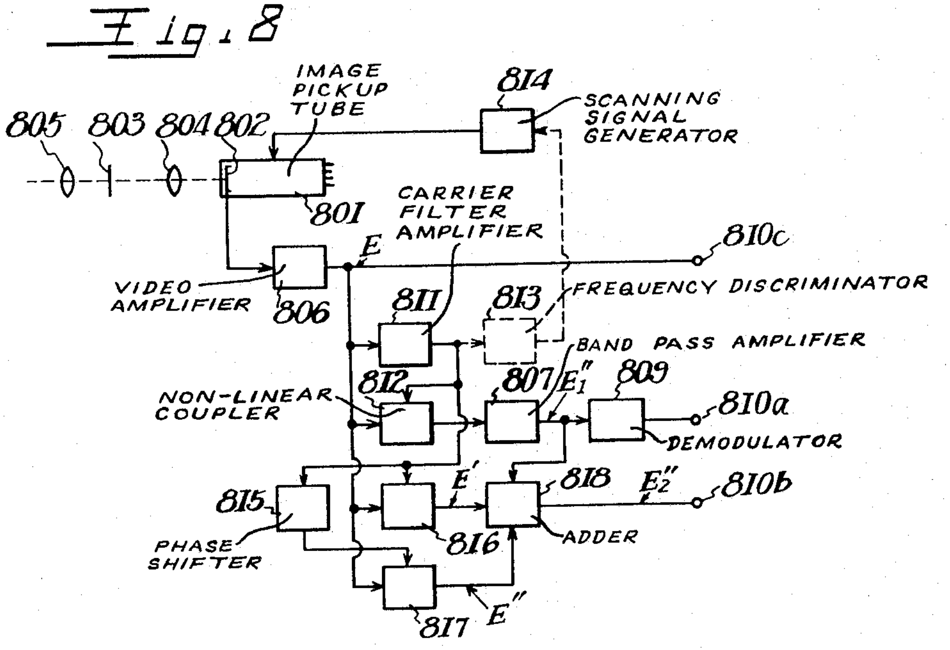
Figure 9:
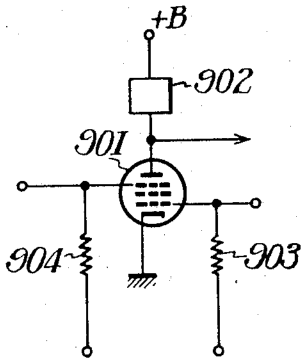
Figure 10:
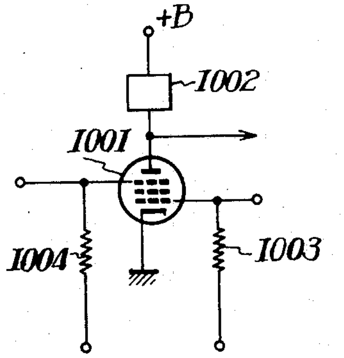
Figures 11, 12, 14:
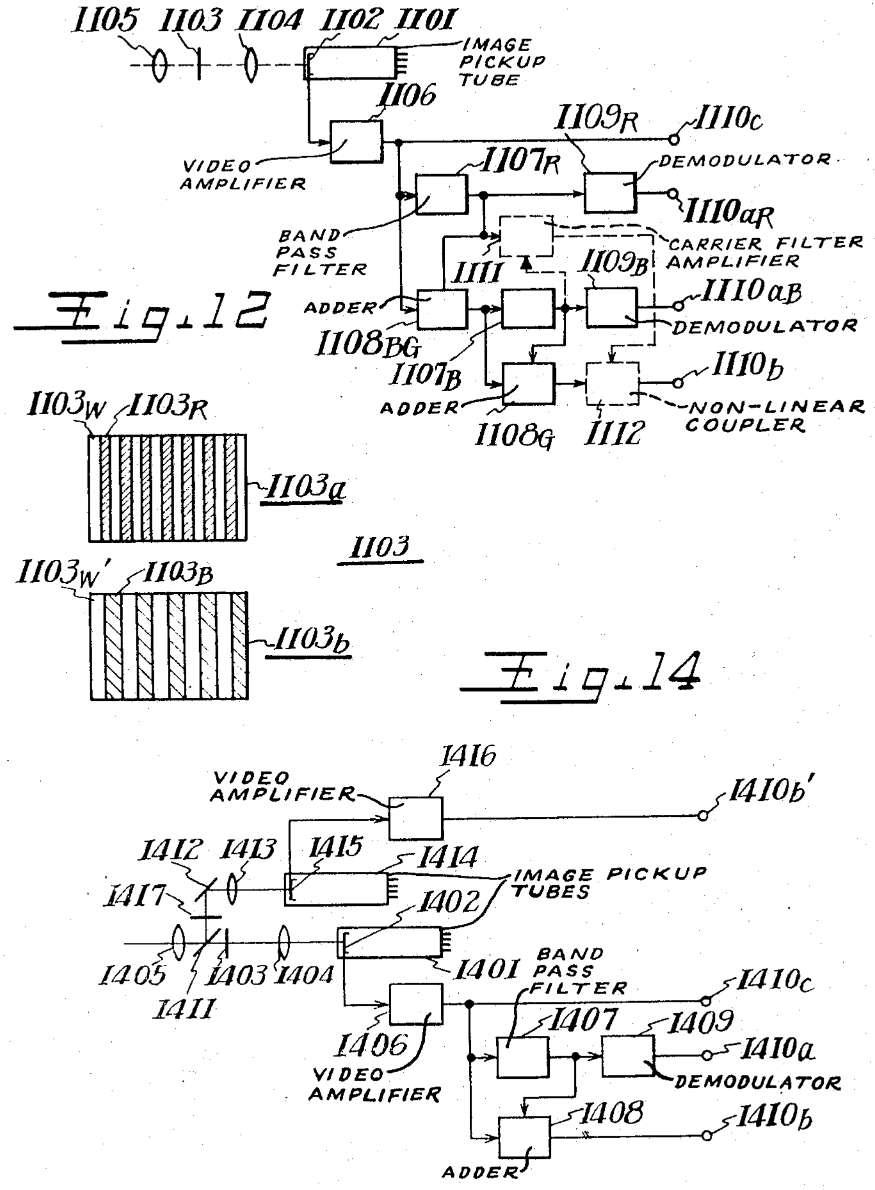
Figure 13:
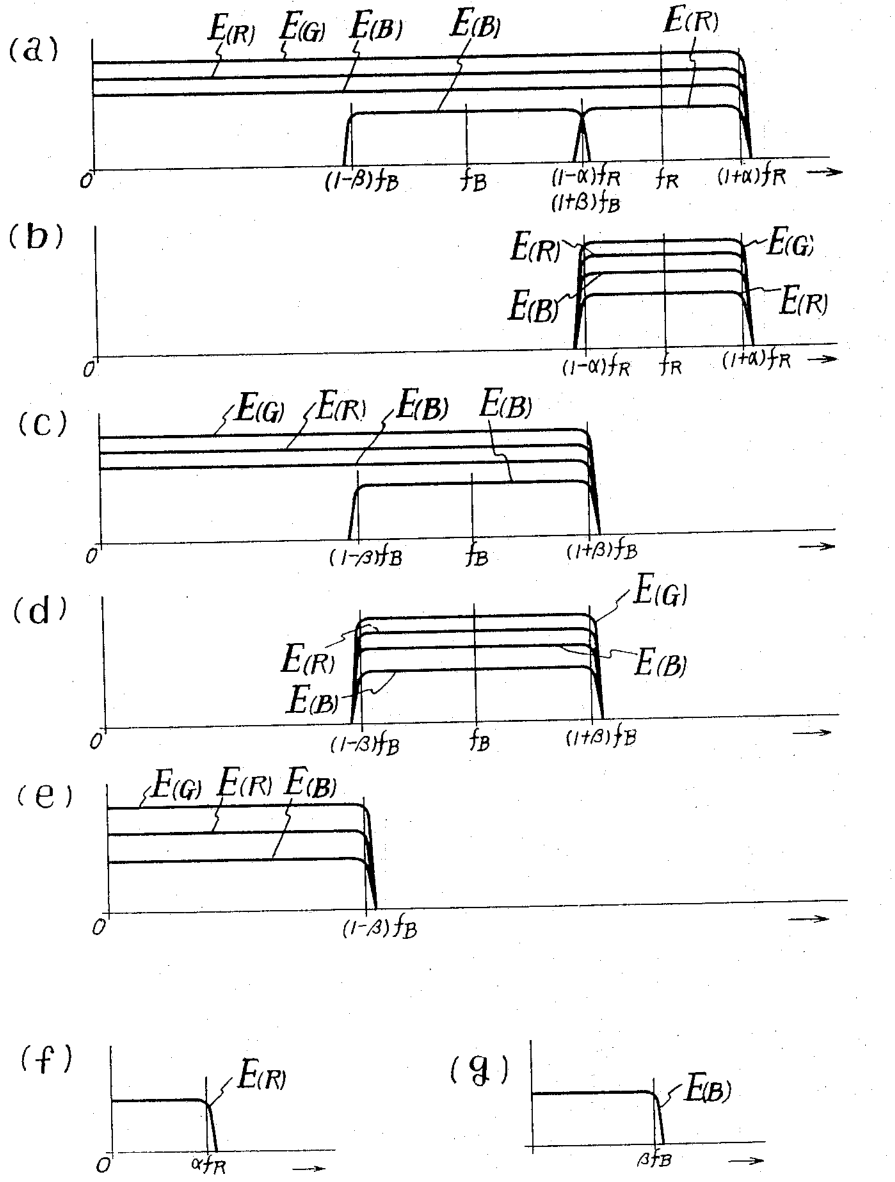
Figure 15:
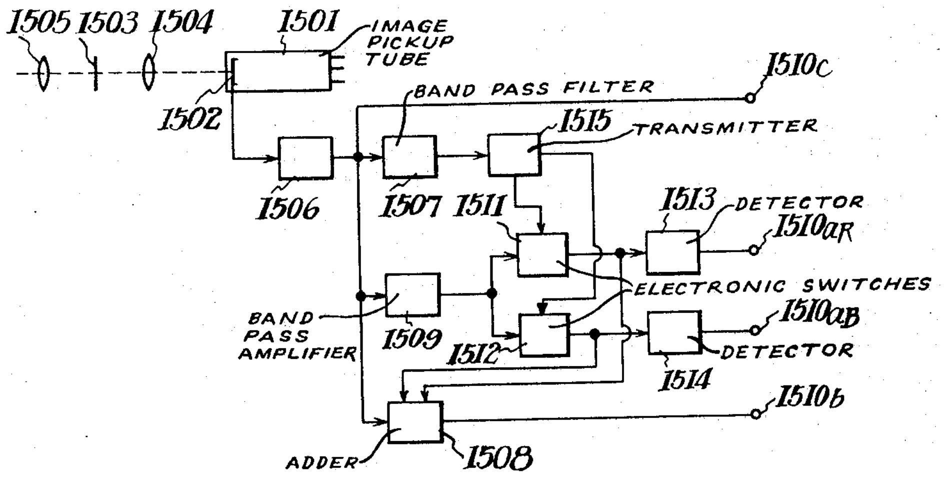
Figure 16:
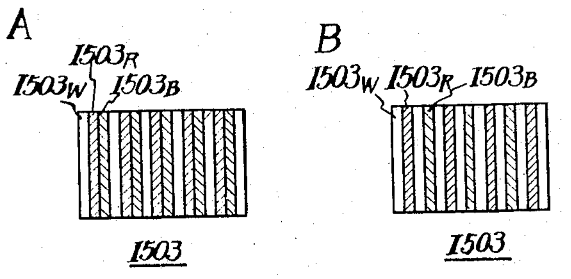

FIGURE 4 fundamentally shows the band of signals having such waveform as shown in FIGURE 3;

FIGURES 5 and 6 are diagrams showing the process of separation of the signals in the structure of FIGURE 1;

FIGURES 7 and 8 respectively illustrate other examples of the fundamental structure of the present invention;

FIGURE 9 is a connection diagram illustrating an example of an adder usable in an embodiment of the present invention;

FIGURE 10 is a connection diagram illustrating an example of a gate circuit;

FIGURE 11 shows a fundamental circuit structure of another example of the present invention;

FIGURE 12 illustrates an example of the filter shown in the embodiment of FIGURE 11;

FIGURE 13 is a diagram illustrating the process of separation of signals in the circuit of FIGURE 11;

FIGURES 14 and 15 show modifications of the circuit structure shown in FIGURE 11; and FIGURE 16 illustrates schematically an example of a filter to be used in the circuit structure of FIGURE 15.

Figure 2:
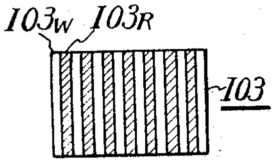
FIGURE 2 illustrates an example of a filter to be employed in the present invention.

Referring now to FIGURE 1, 101 is an image pickup tube and 102 is a photoelectro conversion layer of the pickup tube. 103 is a filter such as illustrated in FIGURE 2, which is made up by arranging strip filter elements 103W and 103R alternately, the former essentially permitting all the colors from an object being televised to pass therethrough and the latter essentially intercepting a color, for instance R (this R does not restrictively designate red). The filter is arranged in a manner so that the respective strip filter elements extend in a direction different from the scanning direction of the image pickup tube 101 and the colors are projected to the aforementioned photoelectro conversion layer 102 through a lens 104.

It will be apparent that when, in a television camera device, a periodically stripe-patterned object is televised, which pattern extends in a direction different from the scanning direction, video signals are obtained having as a fundamental wave a frequency to be determined according to the pitch of the stripes of the filter and the scanning speed of the image pickup tube, which frequency is expressed by $n \times V$, $n$ being the number of pitches per unit length and V the scanning speed. Accordingly, if a color from the object is W (this W does not restrictively designate white) and a color to be essentially cut off by the aforementioned strip filter elements 103R is R, a color to be projected to the photoelectro conversion layer 102 of the image pickup tube essentially without being given changes of the stripe-pattern by the filter 103 in the above structure is expressed by $(W-R)$ and it is a color to be projected to the photoelectro conversion layer 102 of the image pickup tube after being essentially intercepted in stripes by the filter 103. This will easily be understood from a consideration of the fact that since the colors W and $(W-R)$ pass respectively through the filter elements 103W and 103R of the filter 103, the color $(W-R)$ is projected to the entire surface of the photoelectro conversion layer 102 and the color R is projected in stripes at a place corresponding to the elements 103W in addition to the color $(W-R)$. Accordingly, in the case where a fundamental frequency of the carrier of a modulated signal is $f_R$, which signal is produced when the colors from the object is projected to the photoelectro conversion layer with the color R intercepted in stripes, and the peak-to-peak value of the ampiltude of a modulation signal is $E_{(W-R)}$ accordingly it follows that $$E_{(R)}+E_{(W-R)}=E_{(W)}$$

and the widths of the aforementioned filter elements 103W and 103R are equal, a camera output video signal E takes the form of such a waveform as shown in FIGURE 3 which is produced at the terminal of a load impedance of the image pickup tube 101 or at the output terminal 110*c* of a video amplifier 106 including the load impedance to be provided, if necessary. Furthermore, when the phase constant of respective video signal components is such as $\varphi(t)$, where $\varphi(t)=\cos(\omega t+\phi)$ and $\phi$ is a phase angle, the camera output video signal E is expressed as follows:

$$E=\sum_{m=0}^{\infty}E_{(W-R)m}\varphi_{(W-R)m}(t)+\sum_{m=0}^{\infty}\frac{1}{2}E_{(R)m}\varphi_{(R)m}(t)\sum_{n=0}^{\infty}\cos 2\pi nf_Rt \qquad (1)$$

where $m$ is a positive integer, $\varphi_{(W-R)}$ is the phase constant of the video signal of the color $(W-R)$ and $\varphi_{(R)}$ is that of the color R.

It will be seen that even if the higher harmonic component of the carrier, namely $$\sum_{n=2}^{\infty}\cos 2\pi nf_Rt$$

is removed from the modulated signal corresponding to the color R shown by the second term in the above Formula 1, an information of $E_{(R)}$ is essentially maintained. If the fundamental wave frequency $f_R$ is a higher part of the camera output video signal band to be determined according to the resolution of the image pickup tube, higher harmonics of the carrier, namely components of more than $2f_R$ exceed the resolution of the image pickup tube and disappear, or if the aforementioned load impedance of the image pickup tube or the cut-off frequency of the video amplifier 106 including it is set lower than $2f_R$ in such a manner as to correspond to the camera output video signal band, the higher harmonics disappear. Furthermore, if the resolution of the optical system succeeding to the filter 103 is reduced to such an extent that a scene such as to produce an image pickup video signal of more than $2f_R$ cannot be projected to the photoelectro conversion layer 102 of the image pickup tube 101, the higher harmonics disappear, or if the elimination of the color R by the filter 103 is caused to change in stripes sinusoidally, the higher harmonics disappear, too.

If the upper limit frequency of the camera output video signal band, the load impedance of the image pickup tube or the cut-off frequency of the video amplifier 106 including the impedance is $f_C$ which is defined by the resolution of the image pickup tube 101 or that of the optical system and there is no substantial limit to the resolution of the optical system for a scene to produce a camera output video signal of lower than $f_C$, the aforementioned camera output video signal E is given by the following formula:

$$E=\sum_{m=0}^{f_C}E_{(W-R)m}\varphi_{(W-R)m}(t)+\sum_{m=0}^{f_C}\frac{1}{2}E_{(R)m}\varphi_{(R)m}(t)\sum_{n=0}^{1}\cos 2\pi nf_Rt \qquad (2)$$

Since an information sampled at a frequency of $f$ can be reproduced up to a frequency of $f/2$ at the maximum, the upper limit of the frequency of the information of $E_{(R)}$ is 0.5 $f_R$ which is obtained from the second term of the above Formula 2 of the type that the information by the color R has been sampled. However, it is not always easy to reproduce all the information up to this limit or such reproduction is not required in some cases, so that when the information up to $\alpha f_R$ with respect to $E_{(R)}$ is reproduced with $\alpha\leqq 0.5$, the above E in the Formula 2 is given as follows:

$$\begin{aligned}E=&\sum_{m=0}^{f_C}E_{(W-R)m}\varphi_{(W-R)m}(t)+\sum_{m=0}^{f_C}\frac{1}{2}E_{(R)m}\varphi_{(R)m}(t)+\sum_{m=0}^{f_C}\frac{1}{2}E_{(R)m}\varphi_{(R)m}(t)\times\cos 2\pi f_Rt\\=&\sum_{m=0}^{f_C}E_{(W-R)m}\varphi_{(W-R)m}(t)+\sum_{m=0}^{f_C}\frac{1}{2}E_{(R)m}\varphi_{(R)m}(t)+\sum_{m=0}^{\alpha f_R}\frac{1}{2}E_{(R)m}\varphi_{(R)m}(t)\times\cos 2\pi f_Rt\\&+\sum_{m=\alpha f_R}^{f_C}\frac{1}{2}E_{(R)m}\varphi_{(R)m}(t)\times\cos 2\pi f_Rt\end{aligned} \qquad (3)$$

The spectrum of the above is illustrated in FIGURE 4.

In order to obtain a video signal of the color R from such camera output video signal as shown in FIGURE 4, the aforementioned camera output video signal E is added to a band-pass filter 107 having a band-pass width of, for instance $f_R\pm\alpha f_R$ as shown in FIGURE 1 and the output $E_1$ of the filter is expressed by the following formula;

$$E_1=\sum_{m=0}^{\alpha f_R}\frac{1}{2}E_{(R)m}\varphi_{(R)m}(t)\cos 2\pi f_Rt+\sum_{m=(1-\alpha)f_R}^{(1+\alpha)f_R}E_{(W-R)m}\varphi_{(W-R)m}(t)+\sum_{m=(1-\alpha)f_R}^{(1+\alpha)f_R}\frac{1}{2}E_{(R)m}\varphi_{(R)m}(t) \qquad (4)$$

108 is an adder, which adds the aforementioned camera output video signal E and the negative polarity of $E_1$, namely to each other $-E_1$. The output voltage $E_2$ of the adder 108 is given by the following formula;

$$\begin{aligned}E_2=&\sum_{m=0}^{(1-\alpha)f_R}E_{(W-R)}\varphi_{(W-R)m}(t)+\sum_{m=0}^{(1-\alpha)f_R}\frac{1}{2}E_{(R)m}\varphi_{(R)m}(t)+\sum_{m=\alpha f_R}^{f_C}\frac{1}{2}E_{(R)m}\varphi_{(R)m}(t)\cos 2\pi f_Rt\\&+\sum_{m=(1+\alpha)f_R}^{f_C}E_{(W-R)m}\varphi_{(W-R)m}(t)+\sum_{m=(1+\alpha)f_R}^{f_C}\frac{1}{2}E_{(R)m}\varphi_{(R)m}(t)\end{aligned} \qquad (5)$$

It is noted that the third, fourth and fifth terms of the output voltage $E_2$ have much smaller energies substantially than the first and second terms with respect to a usual object to be televised. If $(1+\alpha)f_R=f_C$, the fourth and fifth terms do not ever appear, and it is apparent that a formula $(1+\alpha)f_R=f_C$ implies to make the most effective use of the camera output video signal band width in the practice of the present invention.

Accordingly, $E_2$ is essentially given by the following formula in the form of $E_2'$;

$$E_2'=\sum_{m=0}^{(1-\alpha)f_R} E_{(W-R)m}\varphi_{(W-R)m}(t)+\sum_{m=0}^{(1-\alpha)f_R}\frac{1}{2}E_{(R)m}\varphi_{(R)m}(t) \quad (6)$$

The spectrums of these $E_1$ and $E_2'$ are illustrated in FIGURE 5.

An important advantage in the example of FIGURE 5 is that since $E_2'$ is obtained from the adder 108 by adding the camera output video signal E and the output signal $E_1$ of the band-pass filter 107 to each other at the adder 108, the cut-off characteristic of the upper limit of the band of $E_2'$, namely in the vicinity of $(1-\alpha)f_R$ and that of the lower limit of the pass band of the band-pass filter 107, namely in the neighborhood of $(1-\alpha)f_R$ are symmetrical and clear distinction may be effected between $E_1$ and $E_2'$ without the use of a low-pass filter such that $(1-\alpha)f_R$ is the cut-off frequency with respect to E.

109 is a demodulator for the output $E_1$ of the band-pass filter 107, which demodulates chiefly the first term of the above Formula 4. Its demodulation output $E_3$ is given by the following formula;

$$E_3=\sum_{m=0}^{\alpha f_R}\frac{1}{2}E_{(R)m}\varphi_{(R)m}(t) \quad (7)$$

However, the outputs corresponding to the second and third terms of the Formula 4 other than the output of the Formula 7 are mixed into the output of the demodulator 109 in the form of interference signals (usually these outputs do not exert any influence upon most of objects to be televised even if they are not taken account of because their energies are relatively small). In order to avoid such interference signals, it is possible to set a limit to the performance of the optical system of, for instance FIGURE 1 to reduce the camera output video signal components of the second and third terms between the object and the filter 103 including the objective lens 105.

The spectrum of the output signal $E_3$ at the output terminal 110*a* of the demodulator 109 and the output signal $E_2'$ at the output terminal 110*b* of the adder 108 obtained by the foregoing fundamental structure and operation, are as illustrated in FIGURE 6, and it is apparent that the camera output video signals of the colors R and $(W-R)$ or W may be obtained by linear coupling of the two output signals. The camera output video signals of the respective colors to be obtained by the linear coupling of the above signals $E_2'$ and $E_3$ are reproduced with faithful brightness only in a band from 0 to $\alpha f_R$ and an error of $\frac{1}{2}E_R$ is caused in a band from $\alpha f_R$ to $(1-\alpha)f_R$. However, since there are differences in the resolution of vision to colors, the deterioration of a picture can be prevented substantially by suitably selecting the respective colors.

When obtaining the camera output video signals of the colors R and W without using the linear coupling of $E_2'$ and $E_3$, $E_2'$ is obtained in the Formula 6 by reducing by half the transmission factor over the entire surfaces of the strip filter elements 103W and 103R of the filter 103 for the color $(W-R)$;

$$E_2'=\sum_{m=0}^{(1-\alpha)f_R}\frac{1}{2}E_{(W-R)m}\varphi_{(W-R)m}(t)$$

$$+\sum_{m=0}^{(1-\alpha)f_R}\frac{1}{2}E_{(W-R)m}\varphi_{(R)m}(t)=\sum_{m=0}^{(1-\alpha)f_R}\frac{1}{2}E_{(W)m}\varphi_{(W)m}(t) \quad (6')$$

and $E_3$ can be obtained as previously explained, consequently the above object can be attained.

The interference by the outputs of the second and third terms of the Formula 4 is reduced in the following manner, which occurs when demodulating the output $E_1$ of the band-pass filter 107. A certain amount of color light R' which is intercepted by stripes of the filter 103 is projected to the surface of the photoelectro conversion layer of the image pickup tube, said color light R' being not projected from the object but from an additional light source. Accordingly, Formula 4 is rewritten as follows;

$$E_1'=\sum_{m=0}^{\alpha f_R}\frac{1}{2}E_{(R)m}\varphi_{(R)m}(t)\cos 2\pi f_R t+\sum_{m=1(1-\alpha)f_R}^{(1+\alpha)f_R}E_{(W-R)m}\varphi_{(W-R)m}(t)+\sum_{m=(1-\alpha)f_R}^{(1+\alpha)f_R}\frac{1}{2}E_{(R)m}\varphi_{(R)m}(t)+\frac{1}{2}E'_{(R)}\cos 2\pi f_R t \quad (4')$$

where the camera output video signal per unit area by the projected color R' is designated by $E_{(R')}$. Therefore the demodulator 109 becomes a kind of a synchronous detector having been applied as in-phase carrier of $\frac{1}{2}E'_{(R)}\cos 2\pi f_R t$ which is emphasized by projecting the color light R' through the filter 103 to the photoelectro conversion layer in stripes. In the above formula the output component of the first term becomes sufficiently greater than that of the second and third terms because of the fact that each of the second and third terms of the Formula 4 has a uniform probability to take any frequency and phase in the pass-band of $(1\pm\alpha)f_R$ of the aforementioned band-pass filter and that the interference output of the demodulator 109 which is caused by the second and the third terms depends upon the cosins of the phase difference $\theta$ between the second or the third term and the fourth term due to the synchronous demodulation. Therefore, the interference may be reduced at the following rate;

$$k=\frac{1}{\pi}\int_{-\frac{\pi}{2}}^{+\frac{\pi}{2}}\cos\theta\, d\theta \quad (7)$$

In this case, the output of the demodulator increases the amount of the fourth term of the Formula 4', but this increase always remains at a constant level due to the projection of the color R' so that it may easily be removed from the demodulated output to thereby obtain the desired demodulated signal $E_3$.

Referring now to FIGURE 7, 701, to 709 and 710*a* to 710*c* inclusive are exactly the same structure elements as 101 to 107 and 110*a* to 110*c* inclusive. In addition, 711 is a carrier filter amplifier such that $f_R$ is its center frequency and a band-pass filter having a relatively narrow pass band and an amplitude limiter to be provided from necessity are included therein, and this amplifier separates a carrier of a frequency of $\cos 2\pi f_R t$ from the output E of a video amplifier 706. 712 is a gate circuit which is driven by the separated carrier and the output signal of the video amplifier 706. In such structure, if the phase in which the gate circuit 712 opens is made to be in-phase with the third term of E expressed by the Formula 3, the output $E_1''$ of the band-pass amplifier 707 is given by the following formula in the same manner as that of the aforesaid synchronous detection;

$$E_2''=\sum_{m=0}^{\alpha f_R}\frac{1}{2}_{(R)m}\varphi_{(R)m}(t)\cos 2\pi f_R t+k\sum_{m=(1-\alpha)f_R}^{(1+\alpha)f_R}E_{(W-R)m}\varphi_{(W-R)m}(t)+k\sum_{m=(1-\alpha)f_R}^{(1+\alpha)f_R}\frac{1}{2}E_{(R)m}\varphi_{(R)m}(t) \quad (4'')$$

where $k$ is a proportional constant. Accordingly, the output $E_2''$ of an adder 708 becomes from the Formulas 5 and 6 as follows:

$$E_2''=E_2'+(1-\alpha)\sum_{m=(1-\alpha)f_R}^{(1+\alpha)f_R}E_{(W-R)m}\varphi_{(W-R)m}(t)+(1-k)\sum_{m=(1-\alpha)f_R}^{(1+\alpha)f_R}\frac{1}{2}E_{(R)m}\varphi_{(R)m}(t) \quad (6'')$$

and this spectrum contains video signal components at the rate of $(1-k)$ in a band of higher than $(1-\alpha)f_R$ as compared with $E_2'$ shown in FIGURE 5, as is apparent from the Formula 6″. Therefore, the resolution may substantially be improved in the reproduced video signal of the color W or $(W-R)$. With such arrangement, the interference due to the second and third terms of the Formula 4 may also be reduced at the rate of $k$, and it is also possible to easily separate the carrier in the band-pass amplifier 711 by increasing the carrier due to the color R′.

In the foregoing, since the carrier frequency $f_R$ is produced when the color R intercepted by the aforementioned filter and projected to the photoelectro conversion layer of the image pickup tube and this stripe-pattern intersects with the scanning direction of the image pickup tube, the frequency $f_R$ varies in proportion to the variation in the scanning speed of the image pickup tube, even if the cycle of the stripes on the filter elements is constant. However, it is desired that the frequency $f_R$ is as constant as possible. In order to hold the frequency $f_R$ constant to such an extent as not to cause trouble, the error of the frequency $f_R$ may be reduced to less than several percent by carefully forming the scanning circuit. When further precision is required, the carrier separated by the band-pass amplifier 711 in FIGURE 7 is applied to a frequency discriminator 713 additionally provided and an output voltage of the discriminator 713 indicating errors caused when the frequency $f_R$ rises is applied to a scanning signal generator 714 for the image pickup tube 701 with a connection that the scanning speed of the image pickup tube be lowered.

Furtherfore, the frequency $f_R$ may be kept constant or may be changed with or without the change of the effective scanning line length on the photosensitive layer 702 of the image pickup tube 701 by changing the intersecting angle of the extending direction of the strip filter elements and the scanning direction, without changing the cycle of the stripes of the strip filter elements.

As is apparent from the foregoing and FIGURE 5, the advantage of the present invention is that since the separation of the non-modulated camera output video signal of the color $(W-R)$ is effected by adding the camera output video signal of the entire band and the modulated output signal of the band-pass filter, the cut-off characteristic of the upper limit of the band of the non-modulated camera output video signal becomes substantially symmentrical, with the crossover point as the center, with respect to the cut-off characteristic of band-pass lower limit of the band-pass filter and favorable separation of the two signals is performed. In addition to this, the present invention has advantages in that better demodulation of the modulated signal may be effected by means of adding the color R′, other than the color from the object, so that the amplitude of the carrier of the modulated signal is emphasized.

In the foregoing, as means of making more effective use of the band width of the signal, the band width of the non-modulated video signal may be expanded by using the band-pass characteristic of the band-pass filter as an asymmetrical vestigial side band.

FIGURE 8 illustrates another example of the fundamental structure of the present invention. 801 to 807, 809, 810*a* to 810*c*, and 811 to 814 are exactly the same elements as 701 to 707, 709, 710*a* to 710*c*, and 711 to 714 in FIGURE 7.

In this example, 815 is a phase shifter which shift by $\pi$ radiants the phase of a carrier from a band-pass amplifier 811. 816 and 817 are gate circuits which are gated respectively by the carrier directed from the band-pass amplifier 811 and the carrier having been phase shifted by the phase shifter 815. By these gate circuits the output E from a circuit 806 is gated and applied to an adder 818, to which adder is applied the output from a band-pass amplifier 807 after inverted. In this case the output $E_1''$, of the band-pass amplifier 807 is the same as the Formula 4″ and the output E′ of the gate circuit is in-phase to the carrier from the band-pass amplifier 811 of the camera output video signal E expressed by the Formula 3 and E″ is of $\pi$ phase. This E′ is added to $E_1''$ at the adder 818, and hence the output $E_2''$ of the output terminal 810*b* becomes exactly the same as in the foregoing example and the same effect may be obtained.

FIGURE 9 shows an embodiment of the adders in FIGURES 7 and 8 and for example a multielectrode vacuum tube 901 may be used, to which are applied two signals to be added to its first and third grids and the added output is taken out from its plate. 902 is a load and 903 and 904 are bias resistors of the first and third grids. For example in FIGURE 1, the output of the circuit 106 is added to the first grid and the output of the band-pass amplifier 107 is added to the third grid and the plate of the vacuum tube 901 is employed as the output terminal 110*b*. In FIGURE 8, however, since the adder 818 is provided with three input signal terminals, adders of the type shown in FIGURE 9 are provided in two stages, in the first stage two signals being added and in the second stage the output of the first adder and the remaining signal being added.

FIGURE 10 illustrates an embodiment of the gate circuits 712, 812, 816 and 817 in FIGURES 7 and 8, and it is provided with a multielectrode vacuum tube 1001. To the first and third grids, there are applied respectively a signal to be switched and a switching signal, and an output terminal is connected to a load connected to the plate of the vacuum tube 1001. 1003 and 1004 are bias resistors of the first and third grids. In the example of the gating circuit 712 in FIGURE 1, a signal from the circuit 706 is applied to the third grid of the vacuum tube 1001 and the output of the first amplifier 711 is added to the first grid and the anode is applied to the first filter 707.

The foregoing explanation has been made in connection with a method of obtaining divided camera output video signals of two kinds of colors, but in order to obtain color television signals, it is necessary to obtain camera output video signals of three colors separately. An example of such method is illustrated in FIGURE 11 fundamentally, in which 1101, 1102, 1104, 1105 and 1106 are the same as 101, 102, 103, 104, 105 and 106 in FIGURE 1 and a filter 1103 is the same in arrangement as the filter 103 but different in structure therefrom. That is, the filter 1103 is a filter such that filters 1103*a* and 1103*b* have been piled up or integrated. The filter 1103*a* is provided with strip filter elements 1103W and 1103R in the same manner as the filter 103, but the other filter 1103*b* is a filter composed of a strip filter element 1103W′ which essentially passes all colors from an object and another strip filter element 1103B which substantially cuts off a color B different from the color R intercepted by the strip filter element 1103R, these two filter elements 1103W' and 1103B being arranged alternately in sequential order, and the cycle of the arrangement is different from that of the filter 1103*a*. The extending direction of the respective filter elements of the filter 1103*b* is selected to be parallel or oblique to the direction of the respective filter elements of the filter 1103*a*.

Referring to as $f_B$ the fundamental wave frequency of the carrier of a video signal due to the color B in a camera output video signal, which is caused by projecting the color B to a photoelectro conversion layer 1102 of an image pickup tube after intercepted in stripes, it follows that $f_B \neq f_R$. In the present example $f_B < f_R$ and three primary colors for obtaining color television signals are red, green and blue. If the colors R, B are representative of red and blue respectively, a color $(W-R-B)$ is representative of green, which is referred to as a color G. FIGURE 13 illustrates a process of reproduction of video signals relative to the video signal band of desired respective points and the respective colors, in which similar to $\alpha$ in the foregoing explanation the band width of an information to be obtained from the camera output video signal $E_{(B)}$ of the color B is $\beta f_B (\beta \leqq 0.5)$ and the cut-off frequency $f_C$ of the load impedance or the video amplifier 1106 including the impedance is $f_C=(1+\alpha)f_R$ and the same components as those omitted in the previous explanation are left out. FIGURE 13*a* shows a camera output video signal to be obtained at the output terminal 1110*c* of the video amplifier 1106. 1107R is a band-pass filter which has a pass band of $f_R \pm \alpha f_R$ like the band-pass filter 107 and FIGURE 13*b* illustrates the output of the band-pass filter 1107R. 1108BG is an adder similar to the adder 108, which adds the signals of FIGURES 13*a* and 13*b* with inverse polarities, and FIGURES 13*c* shows the output signal of the adder 1108BG. The cut-off characteristic in the vicinity of the cut-off frequency $(1+\beta)f_B$ of the signal shown in FIGURE 13*c* is determined according to the cut-off characteristic near the cut-off frequency $(1-\alpha)f_R$ of the lower limit of the band-pass filter, and it is as described previously that the two characteristics are substantially symmentrical with their crossover point as the center. 1107B is a band-pass filter which separates, with $f_B \pm \beta f_B$ as a pass band like the band-pass filter 1107R, a signal from the output signal of the adder 1108BG, namely the output signal shown in FIGURE 13*c*, but since the band upper limit of the signal to be passed has been already determined as described above, the cut-off characteristic in the neighborhood of the cut-off frequency $(1+\beta)f_B$ of the upper limit of the pass band need not to be taken so precise account of, and a little margin will suffice. The output signal of the band-pass filter 1107B is shown in FIGURE 13*d*. 1108G is an adder such as the adder 1108GB and adds, with inverse polarities, the output signal of a band-pass filter 1107BG, namely the signal shown in FIGURE 13*c* and the output signal of the band-pass filter 1107B, namely the signal shown in FIGURE 13*d*. FIGURE 13*e* illustrates the output signal of the adder 1108G, and the cut-off characteristic of the band upper limit, namely near $(1-\beta)f_B$ is determined according to the cut-off characteristic of the band lower limit of the band-pass filter 1107B, namely near $(1-\beta)f_B$ and the two characteristics are substantially symmentrical with their crossover point as the center. 1109R and 1109B are demodulators for demodulating the output signals of the band-pass filters 1107R and 1107B and perform the same function as the demodulator 109. FIGURES 13*f* and 13*g* illustrate signals to be obtained at their output terminals 1110*a*R and 1110*a*B.

It is apparent from the foregoing that, with the arrangement of FIGURE 11, camera output video signals well divided in accordance with three kinds of colors may be obtained at the terminals 1110*a*R, 1110*a*B and at the output terminal 1110*b* of the adder 1108G and that desired camera output video signals of the three primary colors may be obtained by the linear coupling of the aforementioned video signals.

In the practice of the present invention in which more than two modulated waves are included in the camera output video signals as previously explained, a stripe-patterned ray of light is projected to the photoelectro conversion layer 1102 of the image pickup tube 1101 by the filters 1103*a* and 1103*b* which is due to their strip filters and this projected light crosses the scanning line of the image pickup tube to thereby produce carriers of $f_R$ and $f_B$, so that beat component currents of $f_R \pm f_B$ and other components are produced in the output current of the photoelectro conversion layer. Of the beat components, the component $f_R+f_B$ is produced outside the band of the video amplifier 1106 and hence it does not appear in the output video signal of the video amplifier 1106, but the component such as $f_R-f_B$ produced in the band of the video amplifier 1106 is mixed into the output signal of the adder 1108G through the adder 1108BG. In order to remove the beat component, there is provided a beat frequency generator 1111, which couples the output signals of the band-pass filters 1107R and 1107B non-linearly and produces a beat component of $f_R-f_B$ and others. The output of the beat frequency generator 1111 is obtained in proportion to the beat component to be mixed into the adder 1108G, so that the output of the generator is added antiphase to the output signal of the adder 1108G at a suitable amplitude in an adder 1112, by which unnecessary beat components are prevented from being produced at the output terminal 1110*b*, improving the quality of a reproduced picture.

It is apparent that many variations may be effected in the arrangement of the respective band-pass filters and adders within the scope of the present invention. In the band-pass filters the video signal band width may be made efficient use of by using their band characteristics as non-symmetrical vestigial side bands, if desired. The demodulation characteristic may be improved by uniformly projecting through the filter 1103, if necessary, a certain amount of a desired color R, B or a color including the two to the photoelectro conversion layer. By providing a gate circuit to be combined with the carrier filter amplifier and the respective band-pass filters to thereby reduce the higher frequency component of the non-modulated video signal to be mixed in the modulated signal, the band width of the non-modulated video signal may be expanded. By reducing substantially by half the transmission factor of the entire area of the filter for a color which has not been intercepted in stripes, camera output video signals of all the colors may be obtained in the form of non-modulated video signals without using the linear coupling of the outputs of the respective terminals. Furthermore, it is also possible to provide means for controlling the scanning speed, if necessary. As described above, various means for improvements may be effected in the foregoing examples shown in FIGURES 1 to 13 inclusive in the present invention.

As to the band characteristics of the circuit shown in FIGURE 11 which are illustrated in FIGURE 13, it is possible to consider an embodiment such that $f_B=4$ mc., $f_R=5.5$ mc., $\beta=0.25$ and $\alpha=0.1$. Furthermore, in order to improve the resolution, it may be such that $f_B$ is higher than 4.5 mc. and $f_R$ is higher than 5.5 mc. In such case $\alpha$ and $\beta$ are determined in accordance with the relation of the resolution to the colors, but since 500 kc. suffices for the color R and 1 mc. suffices for the color B, $\alpha$ and $\beta$ are determined according to them.

A variation on the basis of the principle of the circuit in FIGURE 11 is as shown in FIGURE 14. By providing a semi-transparent mirror 1411 to divide the optical path in two, a total reflection mirror 1412, a lens 1413, 1414, 1415 and 1416 respectively corresponding to 101, 102 and 106 in FIGURE 1, and a filter 1417 of an ordinary type which is provided, if required, and permits a certain color to pass therethrough, in addition to 1401 to 1409 inclusive corresponding to 101 to 109 in FIGURE 1, camera output video signals of three kinds of colors may be obtained at the terminals 1410*a*, 1410*b*, 1410*b*′, thereby obtaining color television signals. FIGURE 15 illustrates an example in which a filter composed of different frequencies $f_R$ and $f_B$ is used, but even if a filter such that $f_R$ and $f_B$ are the same is used, the same effect may be obtained. In this case it is possible to employ a filter such that filter elements 1503W, 1503R and 1503B similar to the filter elements 1103W, 1103R and 1103B in FIGURE 11 are arranged in such an order of 1503W–1503R–1503B–1503W . . . as shown in FIGURE 16A, or in an order of 1503W–1503R–1503W–1503B–1503W–1503R . . . as illustrated in FIGURE 16B. This circuit is shown in FIGURE 15, in which elements 1501 to 1509 inclusive are exactly the same as those 101 to 109 in FIGURE 1. In the present example 1515 is a transmitter which transmits carriers from a band-pass amplifier 1507 as required, by its output electronic switches 1511 and 1512 to which carriers have been added from a band-pass amplifier 1509 are switched respectively at desired phase to thereby divide the carrier from the band-pass amplifier in more than two phases, and their outputs are applied to detectors 1513 and 1514, obtaining their outputs at the output terminals 1510*a*R and 1510*a*B. In this case the same effect as is the case where the output $E_1$ from the band-pass amplifier 107 is added to the adder 108 to obtain the output $E_2$ in FIGURE 1, may be obtained by adding the outputs of the electronic switches 1511 and 1512 of the adder 1508.

It will be apparent that many modifications and variations may be effected without departing from the scope of the novel concept of this invention.

What is claimed is:

1. A color video signal generating apparatus comprising an image pickup tube provided with a photoelectro conversion layer, means for essentially intercepting in stripes at least one of colors from an object to be reproduced and projecting the stripe-pattern to said photoelectro conversion layer in a manner so that said stripe-pattern periodically intersects the scanning direction of said image pickup tube, said means being positioned in an optical path, said image pickup tube producing a composite video signal composed of a non-modulated video signal and a moduated video signal, said modulated video signal corresponding to said intercepted color, a band-pass filter for separating said modulated video signal from said composite video signal, a demodulator connected to the output side of said band pass filter, means connected to the output side of said image pickup tube for separating said non-modulated video signal from said composite video signal by combining said modulated video signal, which has not yet been demodulated by said demodulator, with said composite video signal, and means connected to the output side of said demodulator and the last mentioned means for obtaining color video signal from said demodulated video signal and said non-modulated video signal.

2. A color video signal generating apparatus as claimed in claim 1, wherein a carrier separator is connected to the output side of said image pickup tube and a frequency discriminator is provided which is connected to the output side of said carrier separator, the output side of which is coupled to the scanning period generator of said image pickup tube.

3. A color video signal generating apparatus as claimed in claim 1, wherein a color including one or more than two colors other than a color from object is applied to said optical path so as to emphasize the carrier of the modulated wave.

4. A color video signal generating apparatus as claimed in claim 1, wherein the transmission factor of said optical path for the color to be projected to the photoelectro conversion layer of the image pickup tube substantially without being cut off is changed, by which said non-modulated video signal may correspond to all the colors.

5. A color video signal generating apparatus as claimed in claim 1, wherein another image pickup tube is provided for generating signals corresponding to a color different from those obtained from the first mentioned pickup tube and an optical system are added for affording said different color from the object.

6. A color video signal generating apparatus as claimed in claim 1 wherein another band-pass filter is connected to the output side of said image pickup tube, a phase shifter is connected to the output side of said first mentioned band-pass filter, gate circuits are connected to the output side of said second mentioned band-pass filter to which the output side of said phase shifter is connected, and another detector is connected to the output side of one of said gate circuits, said first mentioned detector being connected to the other of said gate circuits and the output sides of said gate circuits being supplied to said means.

7. A color video signal generating apparatus as claimed in claim 1, wherein a carrier separator is connected to the output side of said image pickup tube for separating the carrier of the modulated video signal, and means are connected to the output sides of said image pickup tube and the last mentioned means for non-linearly coupling said composite video signal with said separated carrier.

8. A color video signal generating apparatus as claimed in claim 7, wherein a frequency discriminator is provided which is connected to the output side of said carrier separator, the output side of which is coupled to the scanning portion of said image pickup tube.

9. A color video signal generating apparatus, comprising an image pickup tube provided with a photoelectro conversion layer, means for essentially intercepting in stripes at least one of colors from an object to be reproduced and projecting the stripe-pattern to said photoelectro conversion layer in a manner so that said stripe-pattern periodically intersects the scanning direction of said image pickup tube, said means being positioned in an optical path, said image pickup tube producing a composite video signal composed of a non-modulated video signal and a modulated video signal, said modulated video signal corresponding to said intercepted color, a band-pass filter for separating said modulated video signal from said composite video signal, a demodulator connected to the output side of said band-pass filter, means connected to the output side of said image pickup tube for separating said non-modulated video signal from said composite video signal by combining said modulated video signal, which has not yet been demodulated by said demodulator, with said composite video signal, another band-pass filter connected to the output side of said last mentioned means for separating another modulated video signal, means connected to the output sides of said last mentioned means and said second mentioned band-pass filter for separating non-modulated signal, another demodulator connected to the output side of said second mentioned band-pass filter, and means connected to the output sides of said last mentioned band-pass filter and said last mentioned means for obtaining color video signals from said demodulated video signals and non-modulated signal.

10. A color video signal generating apparatus as claimed in claim 9, wherein a carrier separator is connected to the output side of said image pickup tube and a frequency discriminator is provided which is connected to the output side of said carrier separator, the output side of which is coupled to the scanning period generator of said image pickup tube.

11. A color video signal generating apparatus as claimed in claim 9, wherein means are connected to the output sides of said first and second mentioned band-pass filters for generating beat frequency, and an adder is connected to the output sides of said means and said last mentioned means for separating non-modulated signals for eliminating an unnecessary beat component caused by non-linearity of said image pickup tube.

12. A color video signal generating apparatus as claimed in claim 11, wherein a carrier separator is connected to the output side of said image pickup tube and a frequency discriminator is provided which is connected to the output side of said carrier separator, the output side of which is coupled to the scanning period generator of said image pickup tube.

13. A color video signal generating apparatus comprising an image pickup tube provided with a photoelectro conversion layer, means for essentially intercepting in stripes at least one of colors from an object to be reproduced and projecting the stripe-pattern to said photoelectro conversion layer in a manner so that said stripe-pattern periodically intersects the scanning direction of said image pickup tube, said means being positioned in an optical path, said image pickup tube producing a composite video signal composed of a non-modulated video signal and modulated video signals, said modulated video signal corresponding to said intercepted color, a first carrier separator connected to the output side of said image pickup tube for separating the carrier, a first gate circuit connected to the output sides of said image pickup tube and said first carrier separator, a first band-pass filter connected to the output side of said first gate circuit, a first adder connected to the output sides of said image pickup tube and said band-pass filter, a demodulator connected to the output side of said band-pass filter, said first carrier separator being connected to the output side of said first gate circuit and a second carrier separator and a second gate circuit respectively connected to the output side of said first adder, a second band-pass filter connected to the output side of said second gate circuit, said second gate circuit being controlled by said second carrier separator and said second band-pass filter being connected to the output side of said second gate circuit, a second adder connected to the output sides of said first adder and said second band-pass filter, a second demodulator connected to the output side of said second band-pass filter, and a matrix circuit connected to the output sides of said first demodulator, second demodulator and second adder.

14. A color video signal generating apparatus as claimed in claim 13, wherein a frequency discriminator is provided which is connected to the output side of said carrier separator, the output side of which is coupled to the scanning period generator of said image pickup tube.

15. A color video signal generating apparatus as claimed in claim 13, wherein means are connected to the output sides of said first and second mentioned band-pass filters for generating beat frequency, and an adder is connected to the output sides of said means and said last mentioned means for separating non-modulated signals for eliminating an unnecessary beat component caused by non-linearity of said image pickup tube.

16. A color video signal generating apparatus as claimed in claim 13, wherein a frequency discriminator is provided which is connected to the output side of said carrier separator, the output side of which is coupled to the scanning period of said image pickup tube, means are connected to the output sides of said first and second mentioned band-pass filters for generating beat frequency, and an adder is connected to the output sides of said means and said last mentioned means for separating non-modulated signals for eliminating an unnecessary beat component caused by non-linearity of said image pickup tube.

17. A color video signal generating apparatus comprising an image pickup tube provided with a photoelectro conversion layer, means for essentially intercepting in stripes at least one of colors from an object to be reproduced and projecting the stripe-pattern to said photoelectro conversion layer in a manner so that said stripe-pattern periodically intersects the scanning direction of said image pickup tube, said means being positioned in an optical path, said image pickup tube producing a composite video signal composed of a non-modulated video signal and a modulated video signal, said modulated video signal corresponding to said intercepted color, a carrier separator connected to the output side of said image pickup tube for separating the carrier of the modulated video signal from said composite video signal, a gate circuit connected to the output sides of said image pickup tube, and said carrier separator, a band-pass filter connected to the output side of said gate circuit, a demodulator connected to the output side of said band-pass filter, other gate circuits respectively connected to the output side of said image pickup tube, a phase shifter to which the output of said carrier separator is supplied, and an adder to which the output of said band-pass filter, which has not yet been demodulated by said demodulator, is supplied the output side of said phase shifter being connected to one of said other gate circuits, and both the output sides of said other gate circuits being connected to said adder, and means connected to the output sides of said demodulator and said adder for obtaining color video signal from said demodulated video signal and said non-modulated video signal.

18. A color video signal generating apparatus as claimed in claim 17, wherein a frequency discriminator is provided which is connected to the output side of said carrier separator and a scanning period generator is provided which is inserted between said image pickup tube and the output side of said frequency discriminator.

19. A color video signal generating apparatus as claimed in claim 17, wherein a frequency discriminator is provided which is connected to the output side of said band-pass filter and a scanning period generator is provided which is inserted between said first mentioned image pickup tube and the output side of said frequency discriminator.

20. A color video signal generating apparatus as claimed in claim 17, wherein a second carrier separator is connected to the output side of said adder, a fourth gate circuit is connected to the output side of said adder, a second phase shifter is connected to the output side of said second carrier separator, a fifth and sixth gate circuit is connected to the output side of said adder, the output of said second carrier separator being supplied to said fifth gate circuit and the output of said second phase shifter being supplied to said sixth gate circuit, a second band-pass filter is connected to the output side of said fourth gate circuit, a second demodulator is connected to the output side of said second band-pass filter, and a second adder is provided to which the output of said second band-pass filter, which has not yet demodulated by said second demodulator, the outputs of said fifth and sixth gate circuits are respectively supplied, the outputs of said second adder and said second demodulator being supplied to said means.

21. A color video signal generating apparatus as claimed in claim 20, wherein a beat signal generator is provided to which the output side of said first mentioned carrier separator and the output side of said second carrier separator are respectively connected and a third adder is also provided to which the output sides of said beat signal generator and said second adder are respectively connected, the output of said third adder being connected to said means.

22. A color video signal generating apparatus as claimed in claim 20, a frequency discriminator is connected to the output side of said first mentioned band-pass filter and a scanning period generator is inserted between the output side of said frequency discriminator and said image pickup tube.

23. A color video signal generating apparatus as claimed in claim 10, wherein a frequency discriminator is provided which is connected to the output side of said first mentioned carrier separator and a scanning period generator is provided which is inserted between said image pickup tube and the output side of said frequency discriminator.

24. A color video signal generating apparatus as claimed in claim 23, a beat signal generator is provided to which the output sides of said first and second mentioned bandpass filters are connected and a third adder is also provided connected to said output sides of beat signal generator and said second adder.

References Cited by the Examiner

UNITED STATES PATENTS

| | | | |
|---|---|---|---|
| 2,705,258 | 3/1955 | Lesti | 178—5.4 |
| 2,733,291 | 1/1956 | Kell | 178—5.4 |
| 2,907,817 | 10/1959 | Teer | 178—5.4 |
| 3,015,689 | 1/1962 | Hirsch | 178—5.4 |
| 3,167,611 | 1/1965 | St. John | 178—5.4 |

DAVID G. REDINBAUGH, *Primary Examiner.*

J. A. O'BRIEN, *Assistant Examiner.*